US008405243B2

(12) United States Patent  (10) Patent No.: US 8,405,243 B2
Siegfriedsen  (45) Date of Patent: Mar. 26, 2013

(54) WIND TURBINE WITH LOAD-TRANSMITTING COMPONENTS

(75) Inventor: Sönke Siegfriedsen, Drage (DE)

(73) Assignee: Aerodyn Engineering GmbH, Rendsburg (DE)

( * ) Notice: Subject to any disclaimer, the term of this patent is extended or adjusted under 35 U.S.C. 154(b) by 618 days.

(21) Appl. No.: 12/531,395

(22) PCT Filed: Feb. 27, 2008

(86) PCT No.: PCT/DE2008/000345
§ 371 (c)(1),
(2), (4) Date: Mar. 3, 2010

(87) PCT Pub. No.: WO2008/113318
PCT Pub. Date: Sep. 25, 2008

(65) Prior Publication Data
US 2010/0164232 A1    Jul. 1, 2010

(30) Foreign Application Priority Data

Mar. 15, 2007 (DE) .......................... 10 2007 012 408

(51) Int. Cl.
*F03D 9/00* (2006.01)
(52) U.S. Cl. ......................................................... 290/55
(58) Field of Classification Search ............... 290/55
See application file for complete search history.

(56) References Cited

U.S. PATENT DOCUMENTS

| 1,514,305 | A | * | 11/1924 | Scholes ........................... 290/55 |
| 2,199,234 | A | | 4/1940 | Arndt |
| 4,527,072 | A | | 7/1985 | Van Degeer |
| 4,871,923 | A | * | 10/1989 | Scholz et al. ................... 290/55 |
| 6,232,673 | B1 | * | 5/2001 | Schoo et al. ..................... 290/55 |
| 6,459,165 | B1 | * | 10/2002 | Schoo ........................... 290/1 C |
| 7,282,808 | B2 | * | 10/2007 | Shibata et al. .................. 290/55 |
| 7,935,020 | B2 | * | 5/2011 | Jansen et al. .................. 475/338 |
| 8,203,229 | B2 | * | 6/2012 | Stone .............................. 290/55 |
| 2006/0052200 | A1 | | 3/2006 | Flamang et al. |
| 2006/0208493 | A1 | * | 9/2006 | Harbourt et al. ................ 290/44 |
| 2006/0220389 | A1 | * | 10/2006 | Shibata et al. .................. 290/55 |
| 2008/0012346 | A1 | * | 1/2008 | Bertolotti ....................... 290/55 |
| 2008/0309091 | A1 | * | 12/2008 | Hahlbeck ....................... 290/55 |
| 2010/0096855 | A1 | * | 4/2010 | Siegfriedsen .................. 290/44 |
| 2011/0084491 | A1 | * | 4/2011 | Kassner ......................... 290/55 |
| 2011/0133453 | A1 | * | 6/2011 | Merswolke et al. ............ 290/44 |
| 2011/0187121 | A1 | * | 8/2011 | Bevington et al. ............. 290/55 |
| 2011/0285143 | A1 | * | 11/2011 | Mascioni ....................... 290/55 |
| 2012/0049535 | A1 | * | 3/2012 | Versteegh ...................... 290/55 |
| 2012/0112463 | A1 | * | 5/2012 | Gelmini ......................... 290/55 |
| 2012/0161449 | A1 | * | 6/2012 | Castell Martinez ........... 290/55 |
| 2012/0248781 | A1 | * | 10/2012 | Casazza et al. ................ 290/55 |

FOREIGN PATENT DOCUMENTS

DE    3625840 A  *  2/1988
DE     268741        6/1989

(Continued)

*Primary Examiner* — Joseph Waks
(74) *Attorney, Agent, or Firm* — Diederiks & Whitelaw, PLC

(57) ABSTRACT

Wind turbines with at least one rotor blade, a hub, a gearbox casing accommodating a gearbox, a generator casing accommodating a generator, a head support, a tower and an azimuth bearing supporting the head support so that it can rotate on the tower, characterized in that the rotor bearing, the gearbox casing and the generator casing are arranged between the hub and the head support, designed as load-transmitting components and joined to each other via screw connections.

14 Claims, 2 Drawing Sheets

FOREIGN PATENT DOCUMENTS

| | | |
|---|---|---|
| DE | 10351524 | 8/2004 |
| DE | 102007012408 A1 * | 9/2008 |
| JP | 59065503 A * | 4/1984 |
| JP | 2001304094 | 10/2001 |
| WO | 02/079644 | 10/2002 |
| WO | 2005/033505 | 4/2005 |

* cited by examiner

WIND TURBINE WITH LOAD-TRANSMITTING COMPONENTS

CROSS-REFERENCE TO RELATED APPLICATIONS

This application represents a National Stage application of PCT/DE2008/000345 entitled "Wind Turbine Comprising Load Transmitting Components" filed Feb. 27, 2008, pending.

BACKGROUND OF THE INVENTION

The patent application relates to a wind turbine with a drive train of compact design.

Over the last decades, wind turbines have steadily grown in size, the trend being in the direction of ever more compact and more light-weight units. Here, so-called thrust bearings are quite often used that do not only absorb the thrust and transverse forces from the rotor but also transmit the bending moments at only one bearing location. Use of these bearings leads to markedly more compact drive trains compared with concepts having a double rotor bearing. However, in most cases of the known turbines, the gearboxes and also the generators are arranged behind the bearing as separate components on a main carrier. The main carrier then has the added function of transmitting the rotor loads from the rotor bearing into the nacelle. Since these thrust bearings have relatively large diameters and a two-dimensional stiff contact surface is required for bolting on over the entire circumference of the bearing, it is preferred to use main carriers of cast design. The loads then have to be introduced from the bearing bolting surface via the main carrier into the nacelle without the structure of the main carrier colliding with the gearbox and the generator. This leads to casting structures that require large openings in the area facing away from the rotor, for inserting the gearbox. These open structures have considerably disadvantages from the view-point of strength and deformations since the components experience large additional stresses as a result. Furthermore, these constructions have too many components since the function of the components is separate from the load transmission. The goal in the development of new wind turbines therefore has to be to design the turbines more compact, more light-weight, and more cost-effective.

WO 2005/033505 A1 shows a design of the drive train that is already very compact, having a separate gearbox and generator, where a large opening is provided for installing the gearbox. To fasten the generator, a further supporting structure is necessary becomes, a nacelle shroud is required to protect the components against climate influences.

DE 103 51 524 A1 likewise suggests a compact solution where it was possible to position the gearbox and the hub still closer together, the shaping of the casting structure of the main carrier is unfavorable, so that high tension peaks and deformations are to be expected. Here, too, a nacelle shroud is required.

With WO 02/079644 A1 a still more compact solution is suggested where part of the gearbox is being integrated into the rotor bearing. However, here too there is an additional gearbox and the separate generator that requires a further supporting structure. Furthermore the large opening can be seen in the cast main carrier, having considerable disadvantages in terms of structure.

DD 268741 A1 likewise shows a compact nacelle construction, this design being possible only for small wind turbines as the turbine is designed as a downwind machine and is equipped without a wind direction tracking unit and a vertical braking device. Furthermore the integration of gearbox and generator into a casing has the advantage of an extremely compact construction, but also the disadvantage that repairs can only be carried out with much effort as the possibilities for accessing the components is severely restricted.

SUMMARY OF THE INVENTION

The object of the invention is to create a drive train that enables a very compact, light-weight, and thus cost-effective total construction and ties the main components such as rotor bearing, gearbox, generator, and wind direction tracking unit into the force transmission from the rotor into the tower. It is to be ensured at the same time that the individual components, in particular gearbox and generator, can be mounted separately and also handled individually for repair work.

The invention achieves a further integration of the functional elements, savings are made regarding components.

In the case of the invention, the components gearbox, generator, and wind direction tracking unit are arranged in separate casings that are bolted together. The respective casings are designed as supporting structure for transmitting the maximum static and dynamic rotor loads. Also the rotor bearing is bolted on to the gearbox casing and transmits the rotor loads into the gearbox casing. The gearbox casing transmits the loads into the generator casing. This casing transmits the loads into the generator casing. The generator casing in turn transmits the loads into the head support that in turn introduces the loads via the azimuth bearing into the tower. As a result of this design, the casings of the components assume the twin function as load transmitting element and as mounting element for the individual parts of the components. This design makes it possible for the machine to be very light-weight and thus cost-effective and also a nacelle shroud to be dispensed with since all components are of such a design that they can be exposed to weathering. For reasons of assembly it makes sense to design the gearbox casing and the generator casing as two separate casings, however it can also be designed as one piece.

This arrangement is exceptionally advantageous if the rotor hub connection, the rotor bearing, the gearbox, and the generator have approximately the same dimensions regarding the outside diameter. This case results in a particularly favorable force transmission without any larger load diversions. This leads to the situation where it makes sense that the gearbox is a two-stage planetary gearbox with coaxial drive and driven axles and has a transmission ratio of approximately 15 to 25. The generator is arranged downstream therefrom and then has a rated speed of approximately 200 to 400 $\min^{-1}$. Both components are installed in a common or two separate casings that are of such a design that they can transmit the loads from the rotor on to the head support. The head support then introduces the loads into the tower and further has the function of accommodating the wind direction tracking unit, the vertical brakes, the gearbox lubrication system, and the heat exchanger for cooling the gearbox and the generator.

BRIEF DESCRIPTION OF THE DRAWINGS

A preferred exemplary embodiment of the invention will be explained below with reference to a drawing, in which.

DETAILED DESCRIPTION OF THE INVENTION

Figure 1:
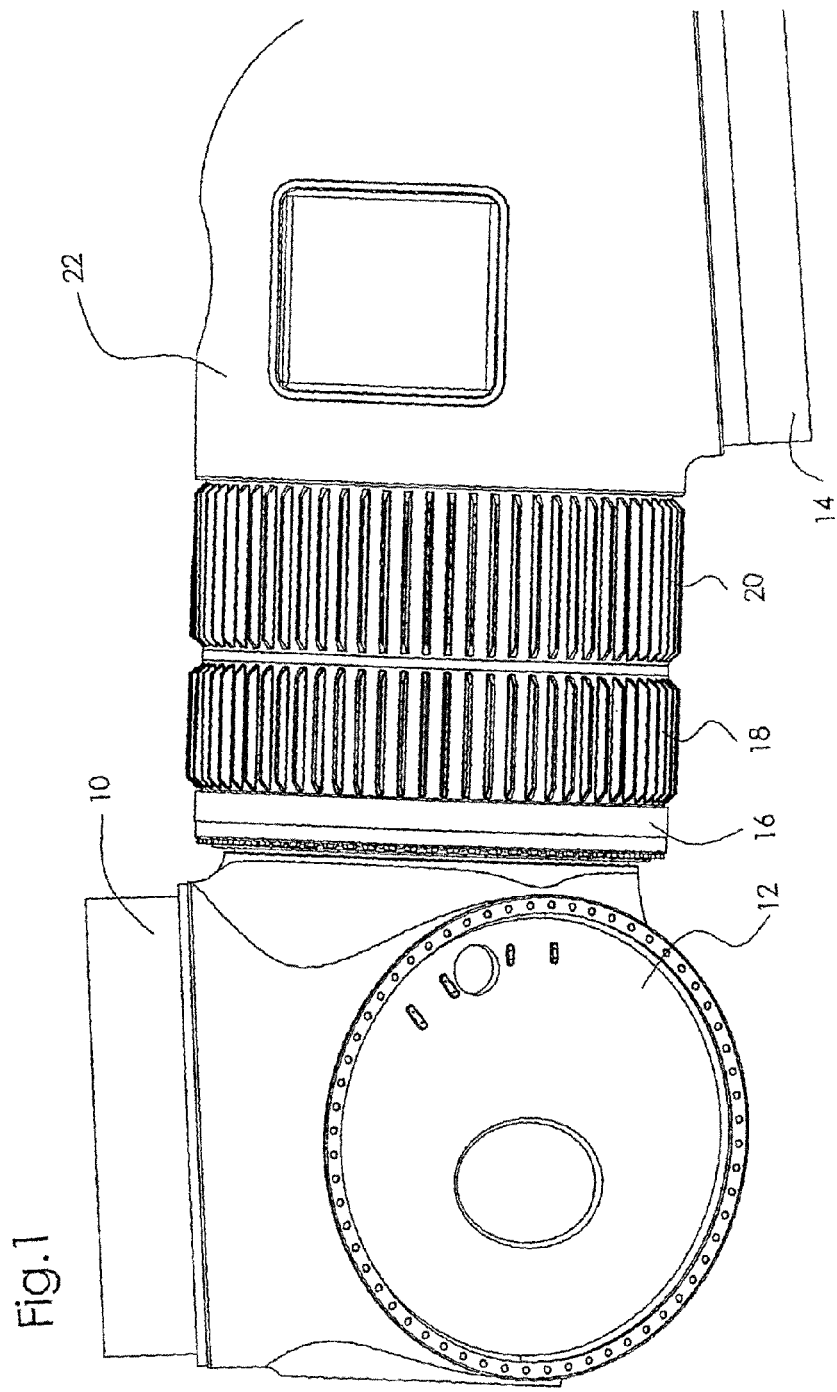
FIG. 1 shows a side view of hub, rotor bearing, generator casing, and head support, only rotor blade being illustrated in section.

The rotor that is formed by the rotor blades 10 and the hub 12 of the wind turbine is supported by the rotor bearing 16 and transmits the forces and moments to the subsequent components. The gearbox is integrated into the gearbox casing 18. The generator arranged downstream is installed in the generator casing 20. Both casings 18, 20 are approximately of the same diameter and are bolted together. The generator casing 20 in turn is bolted to a head support 22 that introduces the loads via an azimuth bearing 42 into a tower 14. All units and components that are required are accommodated in these elements. An additional nacelle shroud for protection against the weather and for accommodating subunits is not required. Both casings are provided with cooling ribs on the outside for partly carrying away the dissipated heat to the outside air.

Figure 2:
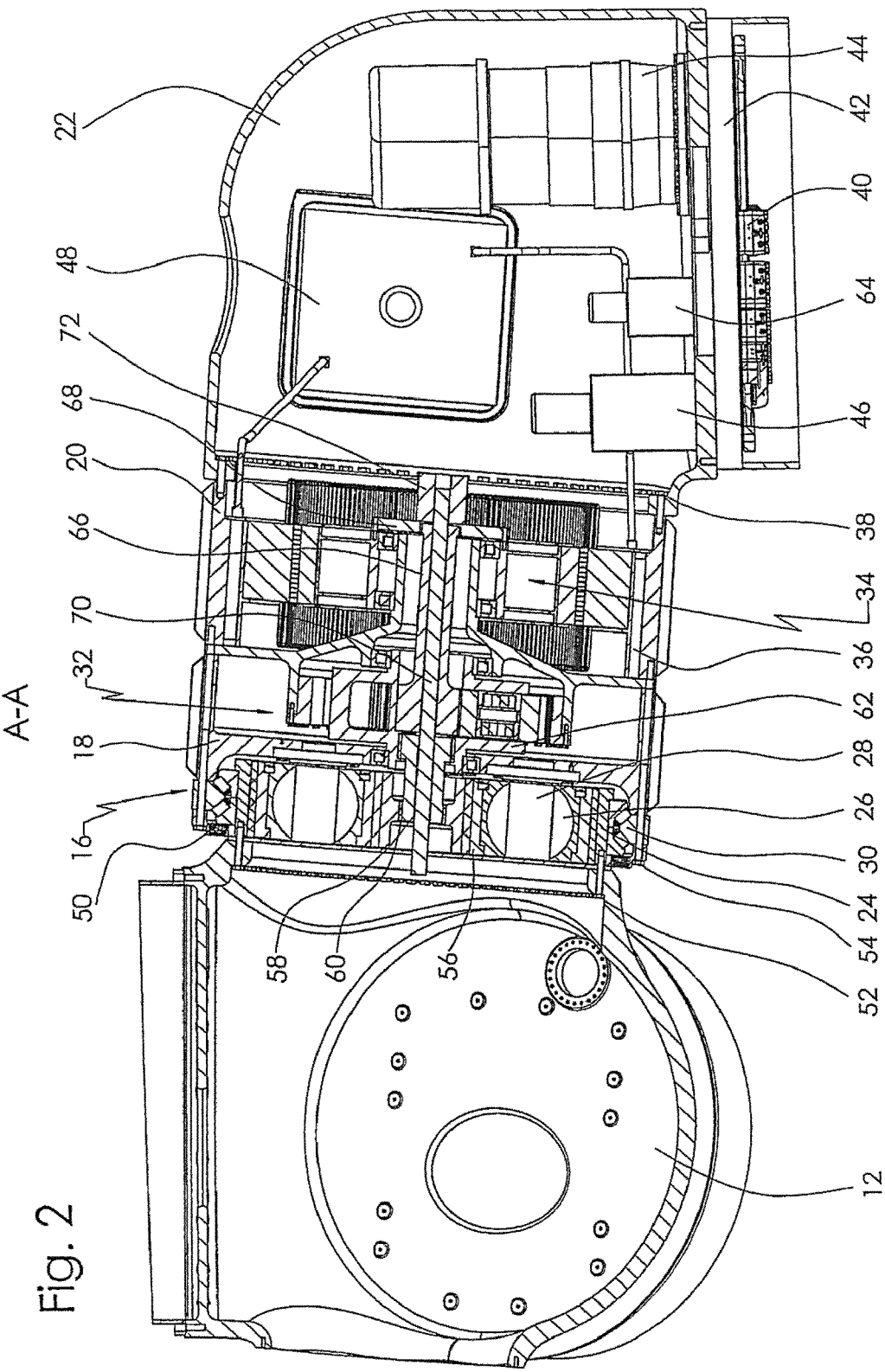
FIG. 2 shows an illustration, partly in section, corresponding to FIG. 1.

The hub 12 is connected (FIG. 2) by means of the screw connection 52 to the ring gear 24 of the first gear stage. This ring gear 24 is pressed into the inside ring of the rotor bearing 16 and permanently connected. The outer ring 30 of the rotor bearing 16 is permanently connected by the screws 54 to the gearbox casing 18 and via this to the generator casing 20. The labyrinth gland 50 seals the gearbox 36 toward the outside. The planetary gears 56 of the first gear stage are supported by means of spherical sliding bearings 26. These sliding bearings 26 are fastened to the gearbox casing 18 by means of bearing journals 28. The planetary gears 56 transmit the torque on to the sun wheel 58. A spiral toothing is fitted centrally inside the sun wheel and transmits the torque on to the intermediate shaft 60. This intermediate shaft 60 in turn is inserted into the planetary carrier 62 of the second planetary stage. The second planetary stage 32 is likewise integrated into the gearbox casing 18 and drives the sun wheel using the transmission shaft 66. This transmission shaft 66 is connected to the generator drive flange 68 in terms of torque by means of a spiral toothing. The generator 34 is designed as a permanent-field synchronous generator that is fitted into the generator casing 20 and is provided with a water cooling jacket 36. The cooling circuit is operated by the delivery pump 64, and the exhaust heat is carried to the outside air by means of the cooler 48. The generator casing 20 is connected to the head support 22 by means of the screw connections 38. The head support 22 contains the servo units 44 for the wind direction tracking unit, the vertical brakes 40, the coolers 48 for the gearbox and the generator, the gearbox oil reservoir 46 with filters and circulating pumps and the circulating pump 64 for the generator coolant circuit. A central pipe 70 is passed centrally through the two gear stages and the generator, and the power supply for adjusting the rotor blades is installed through it. The rotary transfer joint or the slip ring 72 transmits the power required from the stationary part of the head support 22 on to the rotating hub 12.

The invention claimed is:

1. A wind turbine comprising:
at least one rotor blade;
a hub;
a rotor bearing supporting the at least one rotor blade and the hub;
a gearbox casing receiving a gearbox;
a generator casing receiving a generator;
a head support;
a tower; and
an azimuth bearing supporting the head support rotatably on the tower, wherein the rotor bearing, the gearbox casing, and the generator casing are arranged between the hub and the head support, designed as load-transmitting components and joined to each other via screw connections.

2. The wind turbine according to claim 1, wherein the gearbox casing and the generator casing are separate casings.

3. The wind turbine according to claim 2, wherein the gearbox casing and the generator casing have approximately equal outside diameters.

4. The wind turbine according to claim 1, wherein the rotor bearing is a thrust bearing screwed directly in front of the gearbox casing.

5. The wind turbine according to claim 1, wherein the gearbox is a two-stage planetary gearbox.

6. The wind turbine according to claim 1, wherein the generator is a permanent-field synchronous generator.

7. The wind turbine according to claim 1, further comprising outwardly facing cooling ribs provided on the gearbox casing and the generator casing.

8. The wind turbine according to claim 1, further comprising gearbox seals designed as labyrinth glands.

9. The wind turbine according to claim 1, further comprising a water cooling jacket integrated into the generator casing.

10. The wind turbine according to claim 1, further comprising a wind direction tracking unit including the azimuth bearing, servo drives, vertical brakes and a gearbox oil reservoir, wherein coolers for the gearbox and the generator are arranged in the head support.

11. The wind turbine according to claim 1, further comprising a pipe passing centrally through the gearbox and the generator, the at least one rotor blade and the hub forming a rotor, wherein the pipe rotates at the speed of the rotor and is adapted to accommodate power supply lines for adjusting the at least one rotor blade.

12. The wind turbine according to claim 1, wherein the generator casing, the gearbox casing, and the head support are of weatherproof design.

13. The wind turbine according to claim 1, wherein the rotor bearing, the gearbox casing, the generator casing and the head support are sequentially arranged to transfer loads from the hub into the tower.

14. The wind turbine according to claim 1, wherein the head support is configured to transmit loads from both the rotor and the generator casing into the tower.

* * * * *